(12) United States Patent
Hada

(10) Patent No.: US 6,307,536 B1
(45) Date of Patent: Oct. 23, 2001

(54) OPERATING APPARATUS

(75) Inventor: Satoshi Hada, Saitama (JP)

(73) Assignee: Honda Giken Kogyo, Tokyo (JP)

( * ) Notice: Subject to any disclaimer, the term of this patent is extended or adjusted under 35 U.S.C. 154(b) by 0 days.

(21) Appl. No.: 09/263,779

(22) Filed: Mar. 5, 1999

(30) Foreign Application Priority Data

Mar. 17, 1998 (JP) .................................................. 10-066400

(51) Int. Cl.$^7$ .................................................. G09G 5/08
(52) U.S. Cl. .......................................... 345/159; 345/157
(58) Field of Search ................................... 345/157, 159, 345/145, 160–163, 179

(56) References Cited

U.S. PATENT DOCUMENTS

| | | | |
|---|---|---|---|
| Re. 35,342 | * 10/1996 | Louis et al. ............................. | 345/179 |
| 5,469,191 | * 11/1995 | Smith, III et al. ..................... | 345/157 |
| 5,515,079 | * 5/1996 | Hauck .................................... | 345/157 |
| 5,570,111 | * 10/1996 | Barrett et al. ......................... | 345/157 |
| 5,579,032 | * 11/1996 | Busch .................................... | 345/157 |
| 6,154,198 | * 11/2000 | Rosenberg ............................. | 345/161 |

* cited by examiner

*Primary Examiner*—Steven Saras
*Assistant Examiner*—Uchendu O. Anyaso
(74) *Attorney, Agent, or Firm*—Arent Fox Kintner Plotkin & Kahn, PLLC

(57) ABSTRACT

For example, when moving a cursor by a pointer of a note-type personal computer, the cursor can be rapidly moved to a target position, and can be stopped there. When the pointer is operated, the cursor intermittently moves in such a manner that the movement for a predetermined time period $t_1$ and the stop for a predetermined period $t_2$ alternate with each other. At this time, although the predetermined time period $t_1$ of movement of the cursor is constant regardless of whether the amount of the inputting operation, applied to the pointer, is small or large, the speed of movement of the cursor is proportional to the inputting operation amount, and the predetermined period $t_2$ of stop of the cursor is inversely proportional to the inputting operation amount. Even if the operator stops the inputting operation, the cursor is once stopped automatically after the cursor moves for the predetermined time period $t_1$, and therefore even if a control gain is set to a large value so as to move the cursor rapidly, or even if the operator effects the inputting operation roughly, the cursor can be easily moved toward the target position, and can be properly stopped there without overshooting.

10 Claims, 9 Drawing Sheets

LOW VEHICLE SPEED

HIGH VEHICLE SPEED

ONCE-STOPPED POSITION AT
HIGH VEHICLE SPEED IS DECREASED

ONCE-STOPPED POSITION AT
HIGH VEHICLE SPEED IS THE SAME
AS THAT LOW VEHICLE SPEED

OPERATING APPARATUS

BACKGROUND OF THE INVENTION

1. Field of the Invention

This invention relates to an operating apparatus for moving an object to be controlled in accordance with an inputting operation applied to an input member by the operator.

The present application is based on Japanese Patent Application No. Hei. 10-66400, which is incorporated herein by reference.

2. Description of the Related Art

FIG. 11 shows a note-type personal computer, and by moving a stick-like pointer P, mounted on a keyboard, right, left, back and forth, a cursor C on a screen can be moved right, left, back and forth. As shown in FIG. 12, four strain gauges SG for detecting the direction and magnitude of an operating load, applied to the pointer P, are mounted on a proximal portion of the pointer P, and are circumferentially spaced 90° from one another, and the cursor C is moved in the direction of the operating load, detected by the strain gauges SG, at a speed proportional to the magnitude of this operating load.

If a control gain is increased in order to rapidly move the cursor C to a target position on the screen, the cursor C often overshoots the target position to thereby cause the hunting unless the pointer P is carefully operated. If the control gain is decreased in order to avoid this, there is encountered a problem that the speed of movement of the cursor C is lowered, so that it takes a longer time for the cursor to reach the target position.

SUMMARY OF THE INVENTION

With the above problem in view, it is an object of this invention to provide an operating apparatus for moving an object to be controlled in accordance with an inputting operation applied to an input member by the operator, in which the object to be controlled is rapidly moved to a target position by operating an input means, and is stopped there.

According to the invention, there is provided an operating apparatus for moving an object to be controlled in accordance with an inputting operation applied to an input member by the operator, wherein, while the inputting operation by the operator continues, the object to be controlled is stopped for a predetermined period $t_2$ at the time when a predetermined time period $t_1$ elapses after the start of the inputting operation.

In this construction, even if the operator does not stop the inputting operation, the object to be controlled is once stopped automatically after this object moves for the predetermined time period $t_1$, and therefore even if a control gain is set to a large value so as to rapidly move the object to be controlled, or even if the operator effects the inputting operation roughly, the object to be controlled can be easily moved toward the target position, and can be properly stopped there without overshooting.

In the above, a speed of movement of the object to be controlled increases in accordance with the increase of an amount of the inputting operation by the operator.

In this construction, the speed of movement of the object to be controlled increases and decreases in accordance with the increase and decrease of the amount of the inputting operation by the operator, and therefore if the inputting operation amount is increased so as to much move the object to be controlled, the object to be controlled is moved a large distance at high speed, and then is once stopped, and in contrast, if the inputting operation amount is decreased so as to move the object to be controlled a little, the object to be controlled is moved a small distance at low speed, and then is once stopped. Thus, the intention of the operator can be reflected in the movement of the object to be controlled.

The movement speed of the object to be controlled does not always need to be proportional to the amount of the inputting operation by the operator, but may need only to increase in accordance with the increase of the amount of the inputting operation by the operator.

Further, in the above invention, if the inputting operation by the operator is still continued upon lapse of the predetermined period $t_2$, the movement of the object to be controlled is resumed.

In this construction, if the operator wishes to further move the once-stopped object to be controlled, the movement of the object to be controlled can be resumed merely by continuing or maintaining the so far-effected inputting operation without the need for starting a fresh inputting operation, and therefore the operating burden on the operator will not increase.

Still further, the predetermined period $t_2$ decreases in accordance with the increase of the amount of the inputting operation by the operator.

In this construction, if the operator wishes to further move the once-stopped object to be controlled, the time period of stop of the object to be controlled can be reduced by increasing the inputting operation amount, and therefore if the operator wishes to move the object to be controlled rapidly, the time period of stop can be reduced, thereby suppressing the operator's feeling of difference to a minimum. In the case where the object to be controlled is a steering member of a moving body, the object to be controlled can be moved rapidly in accordance with the operator's emergency.

The predetermined period $t_2$ does not always need to be inversely proportional to the amount of the inputting operation by the operator, but may need only to decrease in accordance with the increase of the amount of the inputting operation by the operator.

Still further, the object to be controlled is a steering member of a moving body, and the predetermined time period $t_1$ decreases in accordance with the increase of a speed of movement of the moving body.

In this construction, the time period of movement of the steering member of the moving body decreases in accordance with the increase of the speed of movement of the moving body, and therefore the movement distance of the steering member is decreased when the moving body moves at high speed, thereby preventing the path of movement of the moving body from becoming unstable.

Features and advantages of the invention will be evident from the following detailed description of the preferred embodiments described in conjunction with the attached drawings.

DETAILED DESCRIPTION OF THE PREFERRED EMBODIMENTS

A preferred embodiment of the present invention will now be described with reference to the accompanying drawings.

Figure 1:
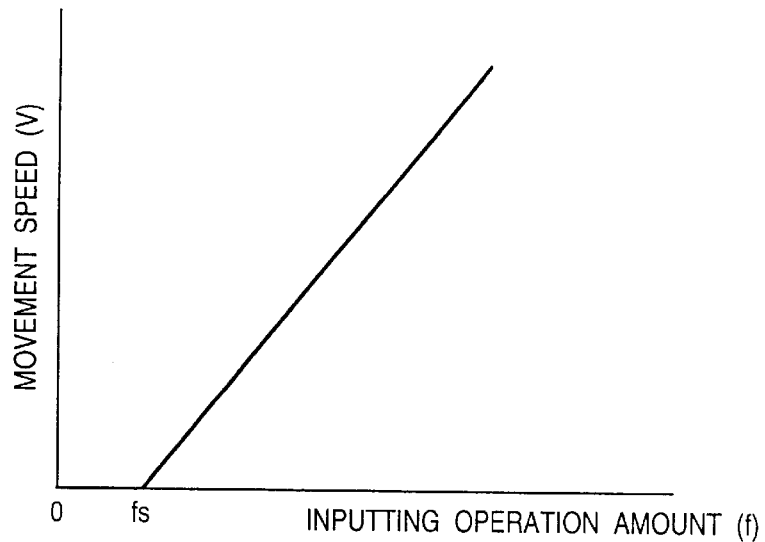
FIG. 1 is a graph showing the relation between an inputting operation amount f and a movement speed V.
Figure 2:
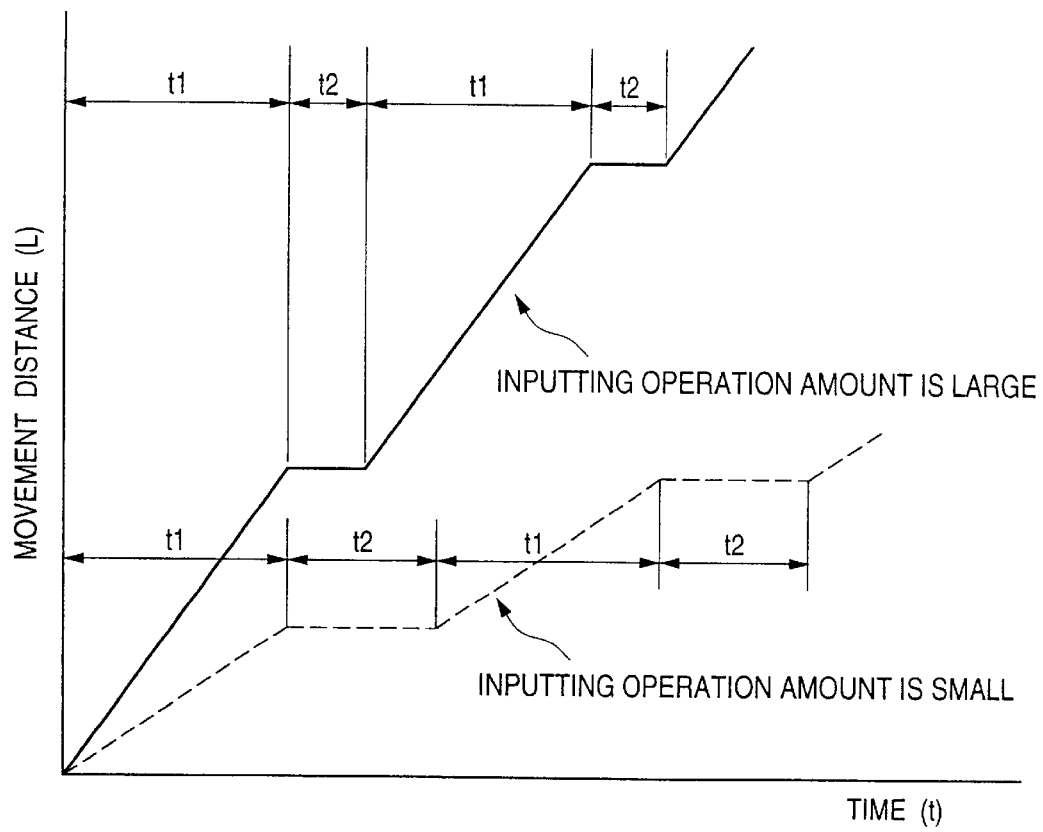
FIG. 2 is a graph showing the relation between time t and a movement distance L.
Figure 3:
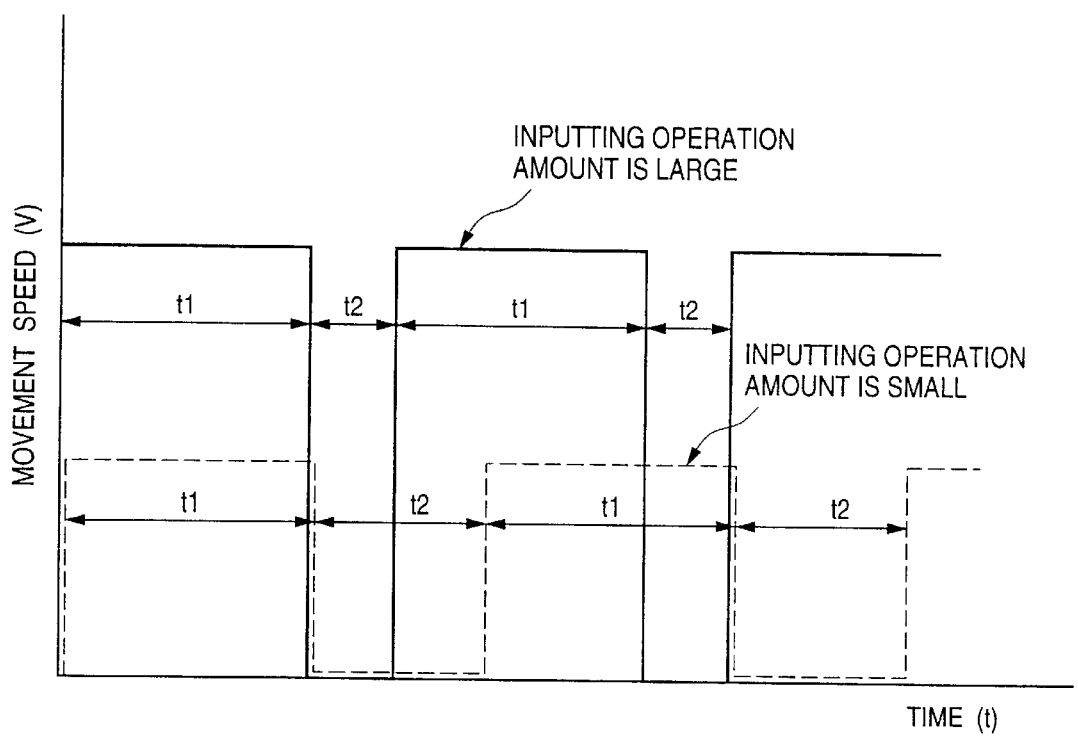
FIG. 3 is a graph showing the relation between time t and the movement speed V.
Figure 4:
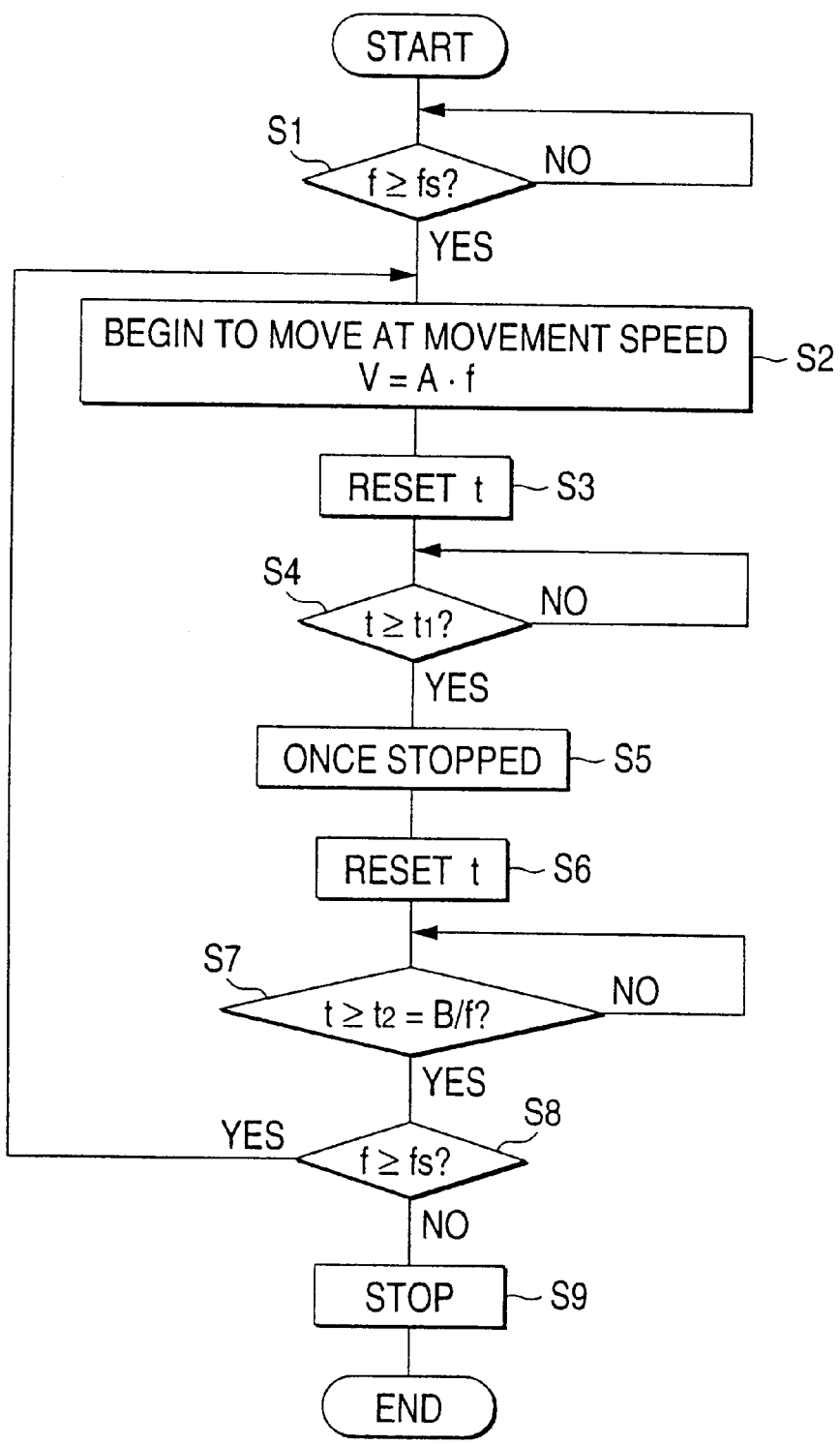
FIG. 4 is a flow chart showing the operation.

FIGS. 1 to 4 show a first embodiment of the present invention, and FIG. 1 is a graph showing the relation between an inputting operation amount f and a movement speed V, FIG. 2 is a graph showing the relation between time t and a movement distance L, FIG. 3 is a graph showing the relation between time t and the movement speed V, and FIG. 4 is a flow chart showing the operation.

Figure 11:
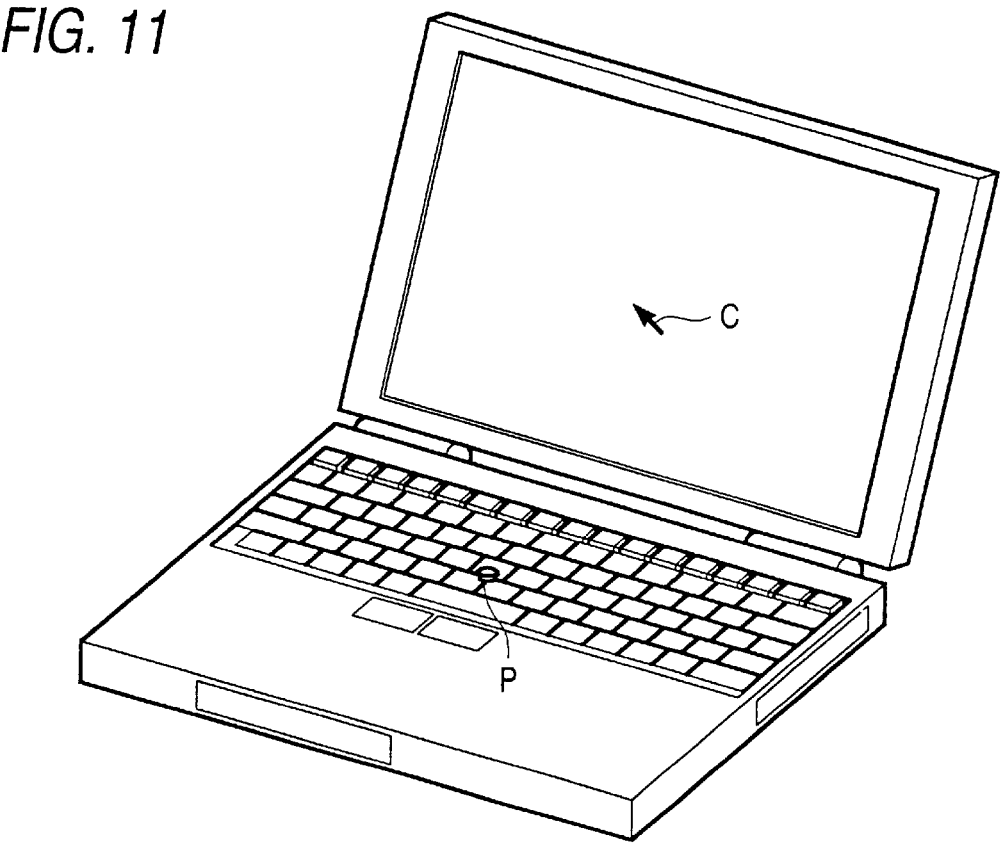
FIG. 11 is a schematic view of a note-type personal computer.
Figure 12:
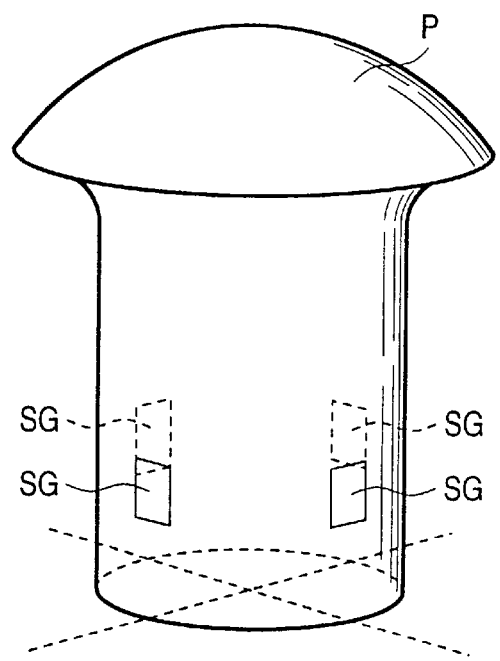
FIG. 12 is a view showing a pointer of the note-type personal computer.

The first embodiment is applied to a pointing device (see FIGS. 11 and 12) of a note-type personal computer, and a pointer P corresponds to an input member of the present invention, a cursor C corresponds to an object to be controlled in the invention, and an operating load, applied to the pointer P, corresponds to the inputting operation amount f in the invention.

In FIG. 1, the abscissa axis represents the inputting operation amount f, and the ordinate axis represents the movement speed V of the cursor C. As is clear from this Figure, the cursor C does not move when the inputting operation amount f is in the range from zero to a value less than an operating threshold value fs, and when the inputting operation amount f becomes not less than the operating threshold value fs, the movement speed V of the cursor C increases linearly in accordance with the increase of the inputting operation amount f. This operating threshold value fs corresponds to a mechanical play of the pointer P.

In FIG. 2, the abscissa axis represents time t, and the ordinate axis represents the movement distance L of the cursor C. In FIG. 3, the abscissa axis represents time t, and the ordinate axis represents the movement speed V of the cursor C. In the two Figures, a solid line indicates the case where the inputting operation amount f is large, and the cursor C moves at: high speed until a predetermined time period $t_1$ elapses after the start of movement of the cursor, and when the predetermined time period $t_1$ elapses, the cursor C once stops. Then, when a predetermined period $t_2$ elapses after the cursor C once stopped, the cursor C again begins to move. Namely, during the time when the operator operates the pointer P with a constant load, the cursor C intermittently moves in such a manner that the movement for the predetermined time period $t_1$ and the stop for the predetermined period $t_2$ alternate with each other.

In FIGS. 2 and 3, a broken line indicates the case where the inputting operation amount f is small, and the movement speed V of the cursor C decreases in proportion to the decrease of the inputting operation amount f, and also the predetermined period $t_2$ of stop of the cursor C increases in inverse proportion to the decrease of the inputting operation amount f. In this embodiment, however, the predetermined time period $t_1$ of one movement of the cursor C is constant regardless of whether the inputting operation amount f is large or small.

Next, the above operation will be described with reference to a flow chart of FIG. 4.

First, in Step S1, when the inputting operation amount f, inputted to the pointer P, becomes not less than the operating threshold value fs, the cursor C begins to move at a movement speed V (=A·f) proportional to the inputting operation amount f (Step S2). Here, A is the proportion constant. Then, in Step S3, a timer is reset, and when the predetermined time period $t_1$ elapses after the resetting of the timer (that is, after the start of movement of the cursor C) (Step S4), the cursor C is once stopped (Step S5).

Then, in Step S6, the timer is reset, and in Step S7, it is judged whether or not the predetermined period $t_2$ elapses after the resetting of the timer (that is, after the stop of the cursor C). This predetermined period $t_2$ is represented by $t_2$=B/f (where B is the proportion constant), and is inversely proportional to the inputting operation amount f. Then; when the predetermined period $t_2$ elapses (This is judged in Step S7), it is judged in Step S8 whether or not the inputting operation amount f is still not less than the operating threshold value fs, and if the judgment result of Step S8 is "YES", the program shifts to Step S2, and the movement of the cursor C is again started. On the other hand, if it is judged in Step S8 that the inputting operation amount f is less than the operating threshold value fs, the program proceeds to Step S9 where the cursor C is stopped.

Namely, during the time when the inputting operation amount f, inputted to the pointer P, is kept not less than the operating threshold value fs, the cursor C intermittently moves in such a manner that the movement for the predetermined time period $t_1$ and the stop for the predetermined period $t_2$ alternate with each other. At this time, although the predetermined time period $t_1$ is constant, the predetermined period $t_2$ increases and decreases in inverse proportion to the inputting operation amount f, and the movement speed V increases and decreases in proportion to the inputting operation amount f.

As described above, the cursor C is automatically stopped intermittently upon lapse of the predetermined time period $t_1$ without requiring the operator to stop the operation of the pointer P, and therefore even if a control gain is set to a large value so as to move the cursor C rapidly, or even if the operator operates the pointer P somewhat roughly, the cursor C can be rapidly moved toward the target position, and can be properly stopped there without overshooting. And besides, the speed V of movement of the cursor C increases and decreases in proportion to the increase and decrease of the inputting operation amount f, and therefore if the inputting operation amount f is increased, the cursor C is moved a large distance at high speed, and then is once stopped, and in contrast, if the inputting operation amount f is decreased, the cursor C is moved a small distance at low speed, and then is once stopped. Thus, the intention of the operator can be accurately reflected in the movement of the cursor C.

If the operator wishes to further move the cursor C once stopped, the movement of the cursor C can be resumed merely by continuing or maintaining the inputting operation so far effected, and therefore the operating burden on the operator will not increase. And besides, if the operator wishes to move the cursor C continuously, the time period (predetermined period $t_2$) of stop of the cursor C can be reduced by increasing the inputting operation amount f, and therefore if the operator wishes to move the cursor C rapidly, the time period of stop can be reduced, thereby suppressing the operator's feeling of difference to a minimum.

Next, a second embodiment of the present invention, directed to a steering apparatus of an automobile, will be described with reference to FIGS. 5 to 10.

Figure 5:
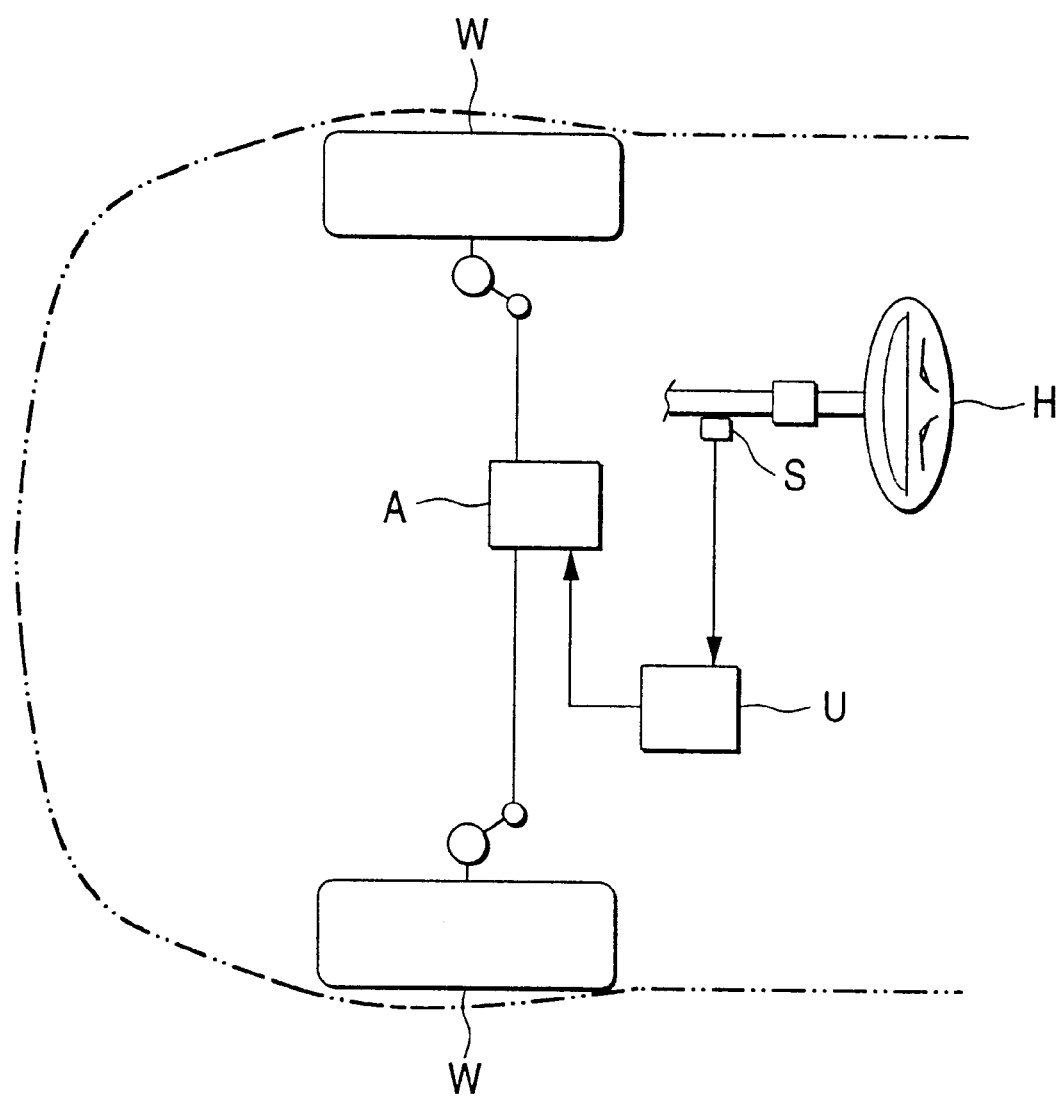
FIG. 5 is a schematic view showing a steering system of an automobile.

As shown in FIG. 5, a steering torque, inputted to a steering wheel H of the automobile by the driver, is detected by a steering torque sensor S. An electronic control unit U controls the operation of an actuator A in accordance with the steering torque, and wheels W and W, connected to the actuator A, are turned or steered right and left. In this second embodiment, the automobile corresponds to a moving (traveling) body in the invention, a vehicle speed Vv of the automobile corresponds to a traveling speed in the invention, the steering wheel H corresponds to an input member of the invention, the wheels W and W correspond to an object to be controlled and steering members in the invention, the steering torque corresponds to an inputting operation amount f, the steering angle of the wheels W and W corresponds to a movement distance L in the invention, and the speed of steering of the wheels W and W corresponds to a movement speed V in the invention.

In this second embodiment, also, when the steering torque is applied to the steering wheel H, the relation of the steering (turning) angle of the wheels W and W (that is, the distance L of movement of the object to be controlled) with time t satisfies the relation of FIG. 2, and therefore the operation for bringing the steering angle of the wheels W and W into agreement with a target value can be easily effected. Particularly, when the inputting operation amount f is increased, the time period (predetermined period $t_2$) of stop of the steering (turning) decreases, and therefore in the event of an emergency as when it is necessary to avoid an obstacle, the wheels W and W can be rapidly steered or turned.

Figure 6:
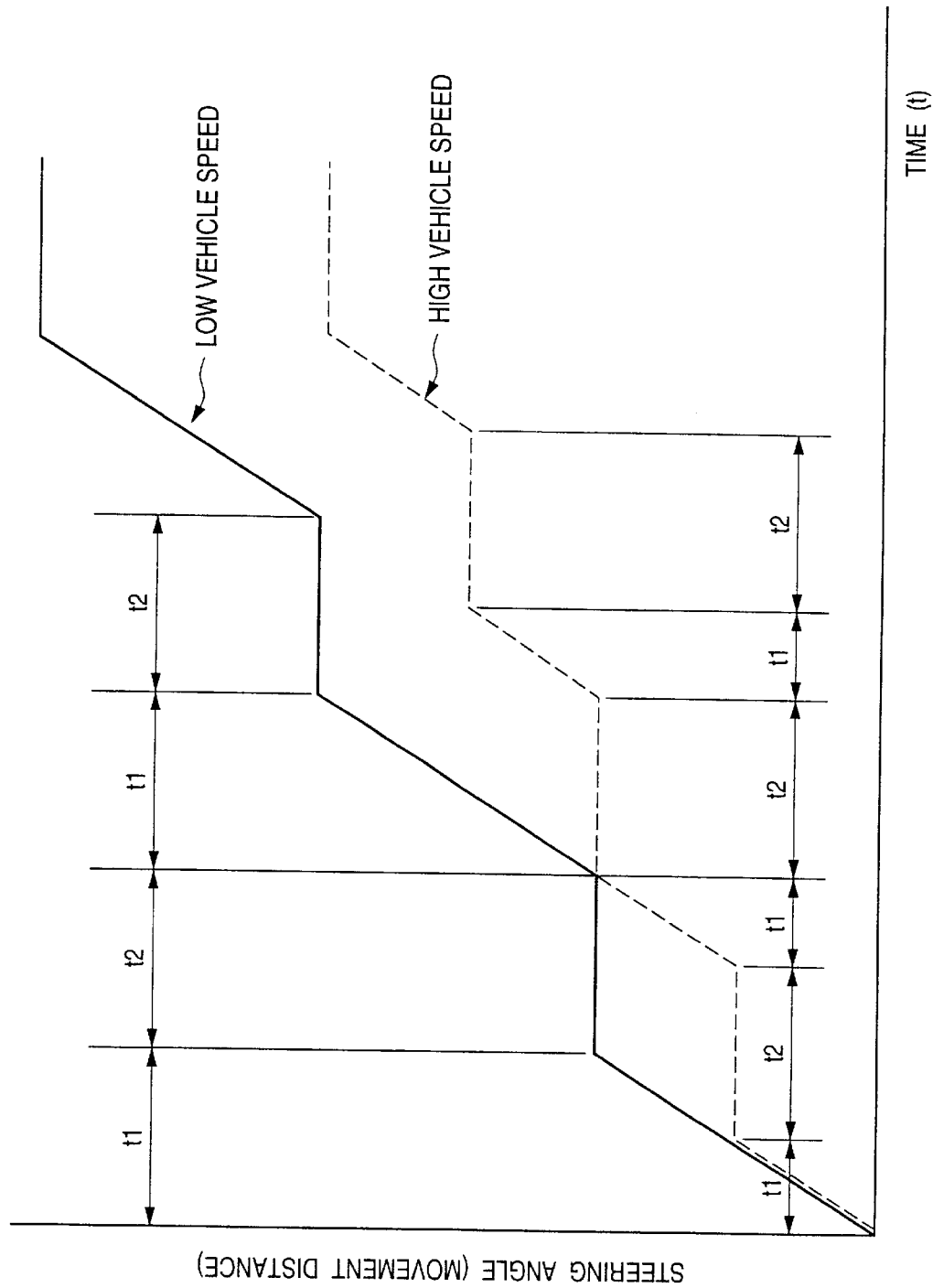
FIG. 6 is a graph showing the relation between time t and a steering angle.
Figure 7:
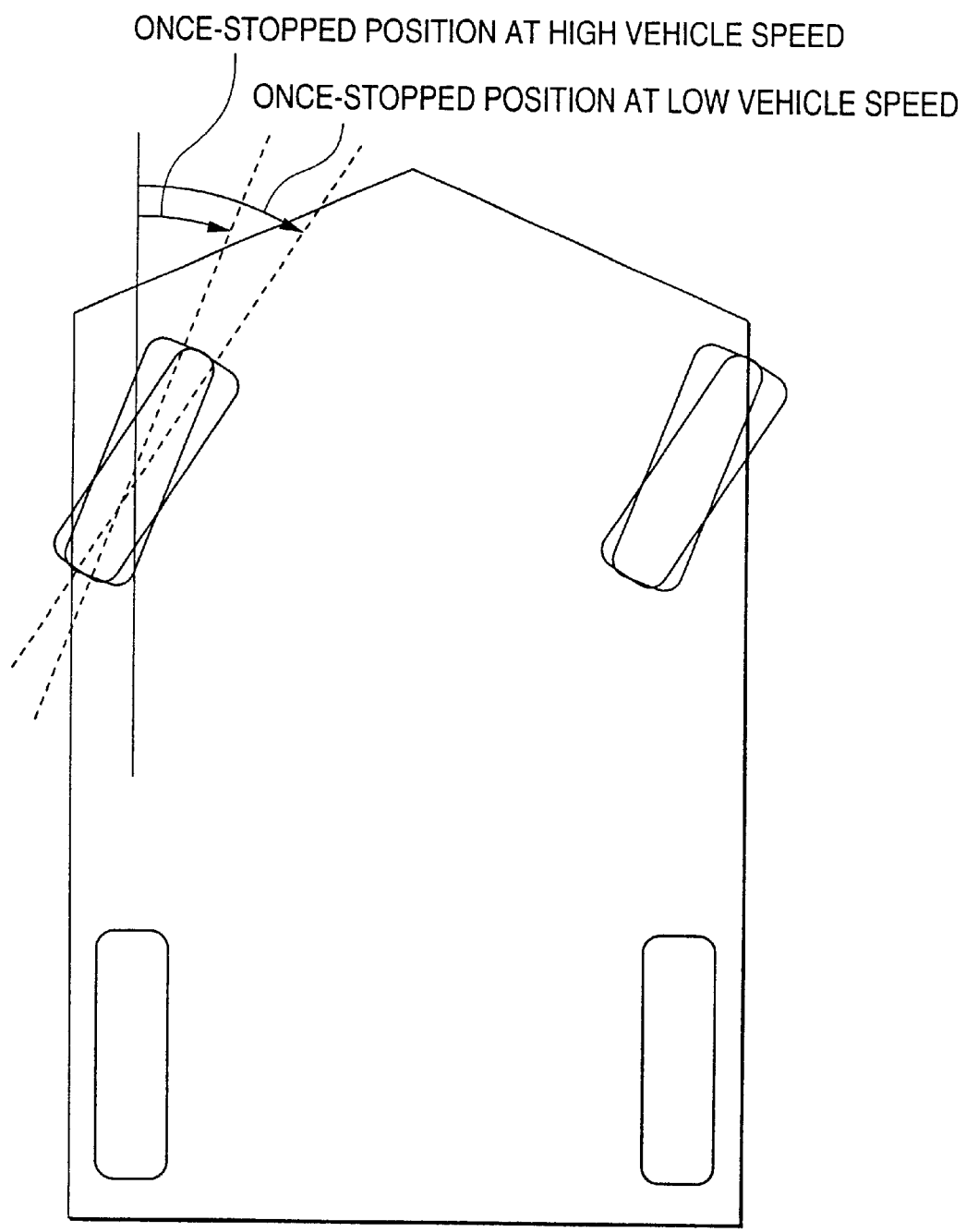
FIG. 7 is a view a once-stopped position concerning the steering angle of the automobile.

In the second embodiment, as shown in FIG. 6, a predetermined time period $t_1$ of steering of the wheels W and W varies in accordance with the vehicle speed Vv of the automobile. More specifically, when the vehicle speed is low as indicated by a solid line, the predetermined time period $t_1$ is set to a long period, and when the vehicle speed is high as indicated by a broken line, the predetermined time period $t_1$ is set to a short period. If the inputting operation amount f, inputted to the steering wheel H, is the same, the steering speed (movement speed V) of the wheels W and W is the same, and also the predetermined period $t_2$ of stop of the wheels W and W is the same, and therefore the steering angle (movement distance L), changing with time t, decreases in accordance with the increase of the vehicle speed Vv of the automobile. Namely, as shown in FIG. 7, even if the inputting operation amount f, inputted to the steering wheel H, is the same, the wheels W and W are steered or turned in a larger amount at low vehicle speed whereas the wheels W and W are steered or turned in a smaller amount at high vehicle speed.

Figure 8A:
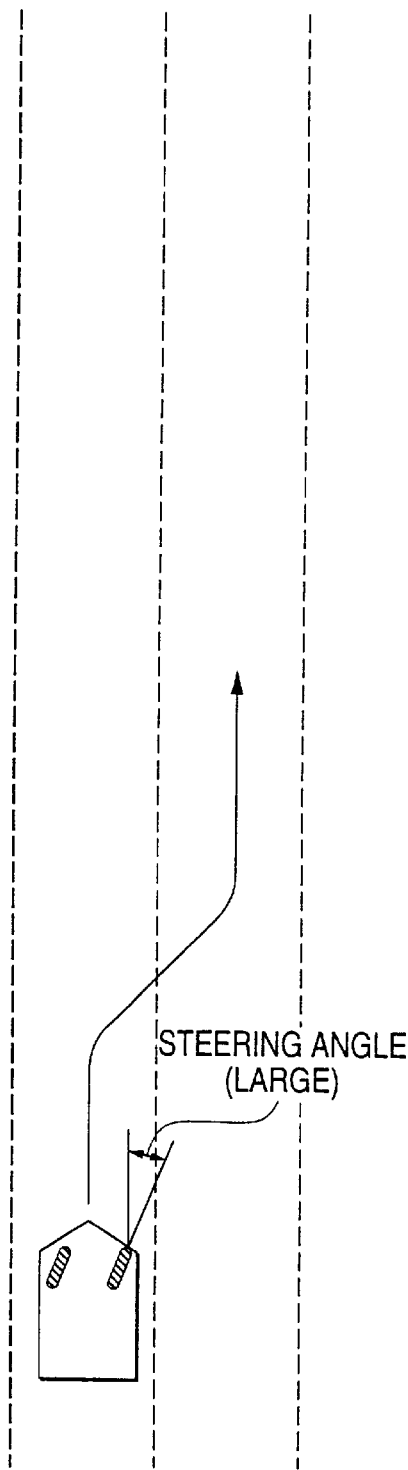
FIGS. 8A and 8B are views showing lane-change operations of the automobile.
Figure 8B:
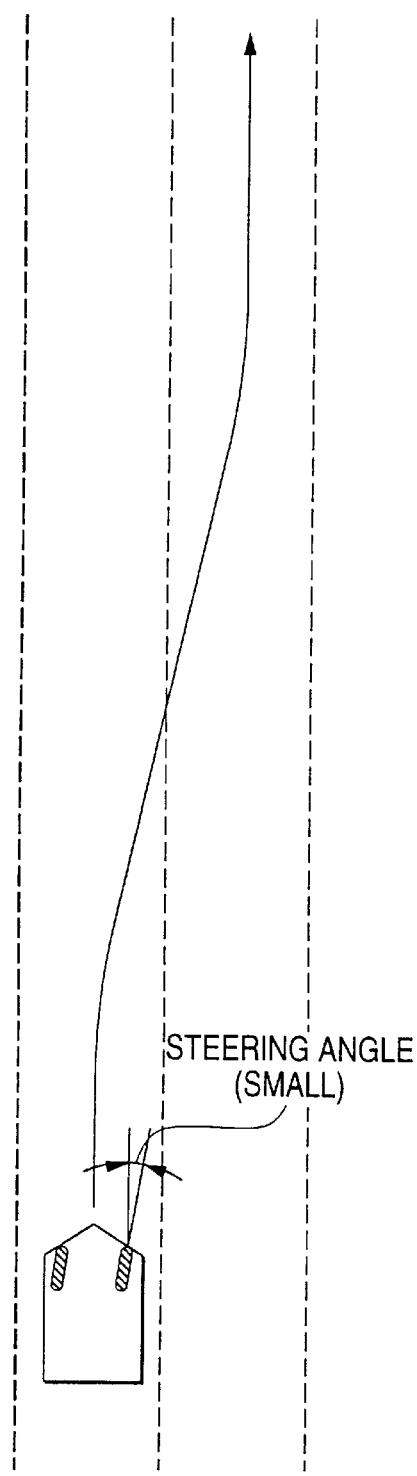
Figure 9A:
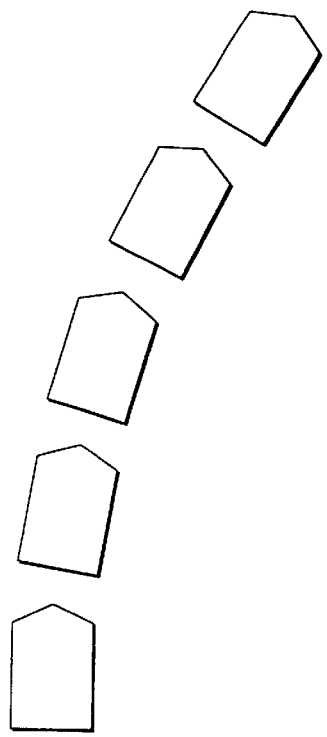
FIGS. 9A and 9B are views showing paths of movements of the automobile in accordance with the steering operation.
Figure 9B:
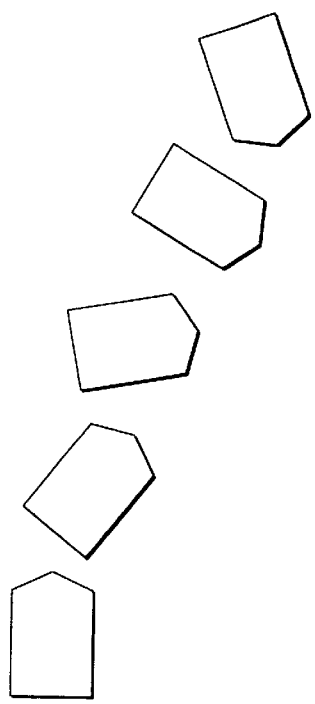
Figure 10:
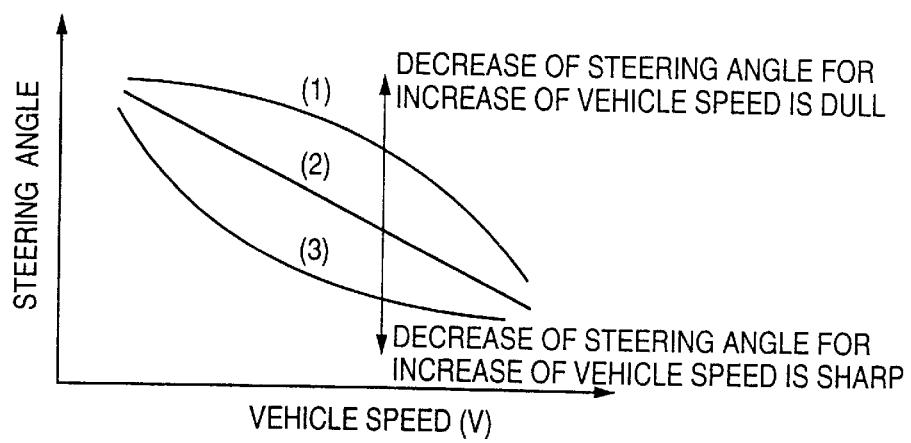
FIG. 10 is a graph showing the relation between a vehicle speed Vv and the steering angle.

Therefore, when shifting the automobile from one lane to another, the steering angle, corresponding to the vehicle speed, is provided as shown in FIGS. 8A and 8B, and the lane change can be effected with the optimum path of movement as shown in FIG. 9A, and besides the automobile, traveling at high speed, is prevented from being steered too much, thereby preventing the behavior of the automobile from becoming unstable as shown in FIG. 9B.

The relation between the vehicle speed Vv of the automobile and the steering angle can be set in various ways by changing the relation between the vehicle speed Vv and the predetermined time period $t_1$. For example, if this relation is set as indicated by (1) of FIG. 10, the decrease of the steering angle for the increase of the vehicle speed Vv is dull, and if the relation is set as indicated by (3) of FIG. 10, the decrease of the steering angle for the increase of the vehicle speed Vv is sharp.

Although the embodiments of the present invention have been described in detail, various modifications can be made without departing from the scope of the present invention.

For example, in the first and second embodiments, although the inputting operation amount f is represented by the load, the inputting operation amount f is not limited to the load, but may be a displacement. The moving (traveling) body is not limited to the automobile, but maybe an air plane, ship or others. In such a case, the object to be controlled is a steering surface such as an aileron, an elevator, a rudder or the like. The predetermined time period $t_1$ and the predetermined period $t_2$ are not determined primarily, but vary in accordance with the characteristics of the control system to which the invention is applied.

In the invention, even if the operator does not stop the inputting operation, the object to be controlled is once stopped automatically after this object moves for the predetermined time period $t_1$, and therefore even if a control gain is set to a large value so as to rapidly move the object to be controlled, or even if the operator effects the inputting operation roughly, the object to be controlled can be easily moved toward the target position, and can be properly stopped there without overshooting.

And the speed of movement of the object to be controlled increases and decreases in accordance with the increase and decrease of the amount of the inputting operation by the operator, and therefore if the inputting operation amount is increased so as to much move the object to be controlled, the object to be controlled is moved a large distance at high speed, and then is; once stopped, and in contrast, if the inputting operation amount is decreased so as to move the object to be controlled a little, the object to be controlled is moved a small distance at low speed, and then is once stopped. Thus, the intention of the operator can be reflected in the movement of the object to be controlled.

Further, if the operator wishes to further move the once-stopped object to be controlled, the movement of the object to be controlled can be resumed merely by continuing or maintaining the so far-effected inputting operation without the need for starting a fresh inputting operation, and therefore the operating burden on the operator will not increase.

Still further, if the operator wishes to further move the once-stopped object to be controlled, the time period of stop of the object to be controlled can be reduced by increasing the inputting operation amount, and therefore if the operator wishes to move the object to be controlled rapidly, the time period of stop can be reduced, thereby suppressing the operator's feeling of difference to a minimum. In the case where the object to be controlled is a steering member of a moving body, the object to be controlled can be moved rapidly in accordance with the operator's emergency.

Still further, the time period of movement of the steering member of the moving body decreases in accordance with the increase of the speed of movement of the moving body, and therefore the movement distance of the steering member is decreased when the moving body moves at high speed, thereby preventing the path of movement of the moving body from becoming unstable.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An operating apparatus for moving an object to be controlled, comprising:

an input member to which an inputting operation by an operator is applied; and means for controlling the object to be controlled in accordance with the inputting operation applied to said input member, thereby moving the object, wherein, while the inputting operation by the operator continues, the object to be controlled is stopped for a predetermined period at a time when a predetermined time period elapses after start of the inputting operation.

2. An operating apparatus according to claim 1, wherein a movement speed of the object to be controlled increases in accordance with increase of an amount of the inputting operation by the operator.

3. An operating apparatus according to claim 1, wherein, if the inputting operation by the operator is continued upon lapse of said predetermined period, movement of the object to be controlled is resumed.

4. An operating apparatus according to claim 1, wherein said predetermined period decreases in accordance with increase of an amount of the inputting operation by the operator.

5. An operating apparatus according to claim 1, wherein the object to be controlled is a steering member of a moving body, and said predetermined time period decreases in accordance with increase of a speed of movement of the moving body.

6. A method for controlling movement of an object to be controlled, comprising the steps of:

applying an inputting operation to an input member;

moving the object to be controlled for a predetermined time period after start of the inputting operation while the inputting operation continues; and stopping the object to be controlled for a predetermined period at time when said predetermined time period elapses while the inputting operation by the operator continues.

7. A method for controlling movement of an object to be controlled according to claim 6, wherein a movement speed of the object to be controlled increases in accordance with increase of an amount of the inputting operation.

8. A method for controlling movement of an object to be controlled according to claim 6, further comprising the step of resuming the movement of the object to be controlled if the inputting operation is continued upon lapse of said predetermined period.

9. A method for controlling movement of an object to be controlled according to claim 6, wherein said predetermined period decreases in accordance with increase of an amount of the inputting operation.

10. A method for controlling movement of an object to be controlled according to claim 6, wherein the object to be controlled is a steering member of a moving body, and said predetermined time period decreases in accordance with increase of a speed of movement of the moving body.

* * * * *

UNITED STATES PATENT AND TRADEMARK OFFICE
CERTIFICATE OF CORRECTION

PATENT NO. : 6,307,536 B1
DATED : October 23, 2001
INVENTOR(S) : Satoshi Hada

It is certified that error appears in the above-identified patent and that said Letters Patent is hereby corrected as shown below:

<u>Title page,</u>
Item [73], Assignee, please change the assignee information as follows:
-- [73] Assignee: Honda Giken Kogyo Kabushiki Kaisha, Tokyo, (JP) --

Signed and Sealed this

Sixteenth Day of March, 2004

JON W. DUDAS
*Acting Director of the United States Patent and Trademark Office*